United States Patent [19]

Kindl

[11] 4,095,954

[45] Jun. 20, 1978

[54] METHOD FOR REMOVAL OF LAST TRACES OF SOLUBLE ASH AND ELEMENTS FROM SOLVENT REFINED COAL

[75] Inventor: Fred Henry Kindl, Schenectady, N.Y.

[73] Assignee: Encotech, Inc., Schenectady, N.Y.

[21] Appl. No.: 695,405

[22] Filed: Jun. 14, 1976

Related U.S. Application Data

[62] Division of Ser. No. 634,283, Nov. 21, 1975, Pat. No. 4,058,976.

[51] Int. Cl.[2] .............................................. C10L 9/10

[52] U.S. Cl. .............................................. 44/1 B

[58] Field of Search ................ 44/1 R, 1 G, 1 A, 1 B; 208/8

[56] References Cited

U.S. PATENT DOCUMENTS

| | | | |
|---|---|---|---|
| 1,420,164 | 6/1922 | Trent | 44/1 A |
| 2,761,824 | 9/1956 | Eastman et al. | 208/8 X |
| 4,021,328 | 5/1977 | Wolk | 208/8 |

FOREIGN PATENT DOCUMENTS

| | | | |
|---|---|---|---|
| 32,607 | 6/1970 | Australia | 44/1 G |

*Primary Examiner*—Carl F. Dees

*Attorney, Agent, or Firm*—Charles W. Helzer

[57] ABSTRACT

Solvent refined coal is treated with liquid water at a temperature of about 500°-550° F in a closed cylindrical vessel under the saturation pressure 665-1030 psig of water at that temperature and under gentle agitation to insure low shear liquid-solid contact for about ½ to 2 hours.

Surprisingly, the soluble ash, generally sodium or potassium salts, is leached out to bring the sodium content down from 50-60 parts per million to a value of less than 1 part per million which makes the product very suitable as a feed for direct firing in a gas turbine.

In addition the total ash content is reduced from a value of approximately 0.1% to a value less than 0.05% which means that in addition to reducing the quantity of sodium and potassium, there are other constituents of the ash which also have been removed.

10 Claims, 4 Drawing Figures

ELECTRIC UTILITY
POWER GENERATION PERFORMANCE
BEST U.S. UNITS, F.P.C. DATA OIL
BEST U.S. UNITS, F.P.C. DATA COAL
G.E & TP&M GUARANTEE POINTS
COMBINED CYCLE FIELD TESTS
STEAM TURBINE
COMBINED CYCLE
HEAT RATE (BTU/KW HR. x 10^-3)
CAPACITY (M.W.)
15
14
13
12
11
10
9
8
0
100
200
300
400
500

EXTRACTOR

METHOD FOR REMOVAL OF LAST TRACES OF SOLUBLE ASH AND ELEMENTS FROM SOLVENT REFINED COAL

This is a division, of application Ser. No. 634,283, filed Nov. 21, 1975 now U.S. Pat. No. 4,058,976.

BACKGROUND OF THE INVENTION (1) Field of the Invention

This invention lies in the field of mixed or special fuels for power plants and in particular the field of treatment by special methods, and in novel apparatus for processing solvent refined coal so that it can be used in the direct firing of power plants (with particular emphasis on gas turbine power plants) and must meet requirements for long service life and for the protection of the environment.

With regard to the generation of electric power from fossil fuel such as natural gas, petroleum fluid and coal, it is now recognized that the most efficient power plant cycle utilizes a combination of gas turbines and steam turbines in what is known as a combined cycle. The heat rates for combined cycle plants are significantly lower than those for the best steam plants in operation in the country over the entire size range for which these kinds of equipment are available. A basic characteristic of the combined cycle is that fuel is burned in a combustion chamber and the products of combustion immediately flow into the turbine where most of the energy is converted to mechanical work. Therefore, in order to utilize any possible fuel in a combined cycle plant it must be in such a form that the hot gases resulting from the combustion process are a suitable working fluid for the gas turbine portion of the set.

Although there have been many attempts to burn coal in a gas turbine, all of these have been unsuccessful because of the very high erosion resulting from the products of combustion. This erosion is the direct result of the high ash which is in the coal and is still present in the combustion products after the combustion process is completed.

(2) Description of the Prior Art

One of the solutions proposed in the prior art to solve the coal burning problem in gas turbines is to reduce the sulfur content of the coal and to also reduce the concentration of harmful elements such as vanadium and the like. The problem with corrosion is well recognized as taught in Bornstein, U.S. Pat. No. 3,581,491.

Steam treatment of coal to remove sulfur and sulfur products has been proposed in Aldridge et al., U.S. Pat. No. 3,600,013.

However, the further application of these known methods has not solved the corrosion problem and in the development of solvent refined coal the first practical fuel appears to be at hand for direct firing of power plants since it appears that sulfur and ash have been reduced to meet environmental restrictions.

In solvent refined coal, the ash content of the coal has been reduced to a sufficiently low level so that it appears the fuel has the potential for direct firing in a gas turbine with out the previous unsatisfactory erosion results, and therefore, utilization in a combined cycle power generation plant. Because of the higher efficiency of a combined cycle plant, this would clearly be a more desirable way in which to utilize this fuel for power generation purposes.

The solvent refined coal product currently being produced has one additional problem standing in the way of its being successfully utilized as a gas turbine fuel. This is that the product contains trace quantities of the elements sodium and potassium that are sufficient to promote hot sulfidation or corrosion of the high temperature gas turbine parts, particularly the first stage turbine blades. The quantities of these two elements in the solvent refined coal product as produced by current processes are in the order of 40–60 parts per million (ppm). In order for this to be a satisfactory gas turbine fuel, these trace element quantities must be reduced to a value less than 1 ppm, and this invention demonstrates that a simple non-chemical extraction process and apparatus can be made to accomplish this.

The solvent refined coal material is solid at room temperature but as delivered from the processing plant has a melting point of about 300° F. It has been observed that if the material is heated to above the melting point in the presence of oxygen, or air, that an undesirable chemical reaction takes place which results in a rather rapid increase in viscosity and an increase in the melting point, however, if this heating to temperatures above the melting point takes place in the presence of an inert atmosphere, such as nitrogen or water vapor, the undesirable changes in chemical properties do not occur. The apparatus and process of the invention involves the use of water and steam and so makes it possible to further process and pump the material in a satisfactory manner.

A further advantage to the washing process of the invention is that in the solvent refined coal the total ash content is reduced as differentiated from just the sodium and postassium portion of this ash. After washing under pressure, the ash content is reduced to about 0.05% or to approximately ½ or less than it had in the as-received condition.

I am aware that there has been proposed in Rieves, U.S. Pat. No. 3,660,054, to heat coal with very limited quantities of water under very high pressures, e.g., about 1,545 to 3,226 psig in order to reduce the ash to about 6% and to reduce sulfur.

In contrast to this procedure in Rieves, the process of the present invention starts with solvent refined coal in which the ash content is about 0.2 to 0.1% and there are 40–60 parts per million each of sulfur and alkali metal salts such as the sodium or potassium salts.

One would not expect that ash reduction by treatment under far lower temperatures could bring about a greater than 50 fold reduction in alkali metal ash when substantial quantities remain (e.g., 6%) ash in the coal after treatment by the method of Rieves.

OBJECTS OF THE INVENTION

An object of the invention is to provide a method of water washing solvent refined coal with the primary objective of reducing the sodium and potassium content to levels which are acceptable for direct firing into a gas turbine or to any combustion process such as a steam boiler.

Another object of the invention is to provide a water washing process for solvent refined coal in which there is an anticipated further reduction in the sulfur content which will make it more desirable as a gas turbine and/or a boiler fuel.

Another object is to provide for an initial mixing of ground up solvent refined coal and water, and contact heating with steam to a temperature of 212° F at one atmosphere in order to provide a deaerated water-solvent refined coal slurry suitable for feeding to the main water washing process.

Yet another object of the invention is to provide a water washing process for solvent refined coal in which the whole process is carried out at a high enough pressure and temperature that air and oxygen are excluded thereby permitting the processing of the material in the fluid state without the degradation in properties that has been observed when air and/or oxygen are present.

The objectives of this invention are generally directed at preparing this fuel for use in a gas turbine, but the reduction in sodium and potassium content will have beneficial effects for those situations in which the solvent refined coal product is used for a steam boiler fuel. Sodium and potassium do not present serious problems for boiler fuels, however, it has been demonstrated that their elimination does provide a somewhat improved combustion process and some reduction in boiler corrosion problems. Also, the reduction in total ash content should be beneficial when used as a boiler fuel from the standpoint of reduced particulate emissions and the anticipated reduction in sulfur content should also be beneficial from an environmental standpoint.

Still a further object of the invention is to provide apparatus which is simple in construction for receiving and grinding solvent refined coal, monitoring the proportions of water and solvent refined coal, mixing and heating with steam at one atmosphere to provide an air free slurry, pumping to processing pressure and further heating to processing temperature, subsequent mixing to promote contact between all the solvent refined coal and the wash water and then settling and separation of the water and solvent refined coal to provide for reduction of the water soluble alkali salts to levels such that the summation of sodium and potassium concentration is less than 1 ppm.

BRIEF DESCRIPTION OF THE DRAWINGS

Other objects of the invention will become apparent from the following description taken in connection with the accompanying drawings.

THE PREPARATION OF LIQUIFIED COAL AS A GAS TURBINE FUEL

Figure 1:
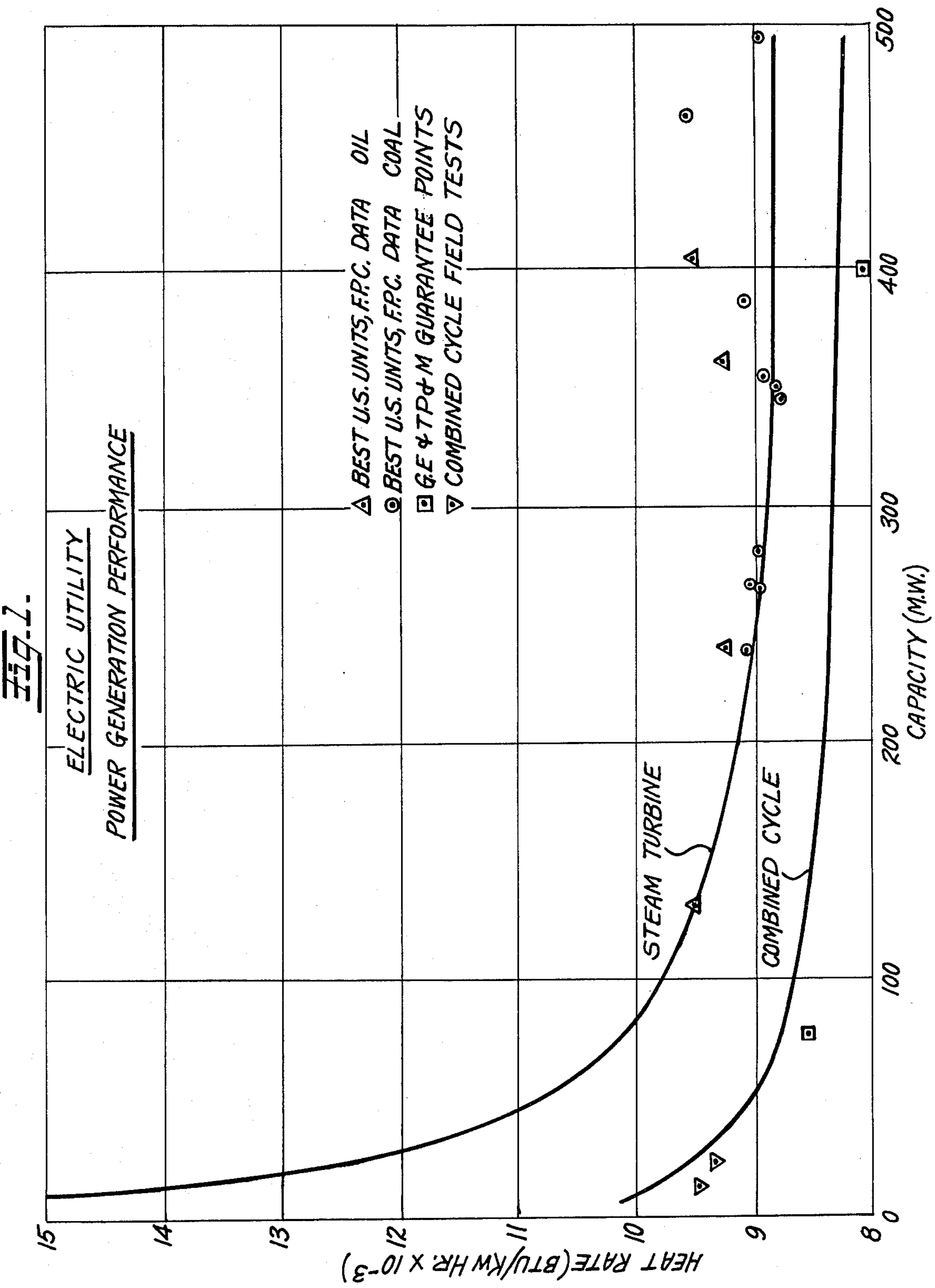
FIG. 1 is a graph showing the power generator performance in electrical utilities for Best U.S. Units, F.P.C. Data Oil, Best U.S. Units, F.P.C. Data Coal, G.E. and TP&M Guarantee Points, and Combined Cycle Field Tests, the Y axis being set forth in units of heat rate (BTU per kilowatt hour $\times 10^{-3}$) and the X axis being set forth in units of capacity (Megawatts).

At the present time under the Clean Fuel From Coal Program the product is about 15,700 BTU's per pound and contains about 0.2% ash and 0.5% sulfur. It can be handled pretty much like a heavy oil at 350° to 375° F or it can be solidified to a granular form.

The low ash content permits the possibility of firing it directly into the gas turbine either as a liquid or as a pulverized solid.

The product can be handled at 250°–375° F as a liquid, at which temperature its physical characteristics closely resemble a heavy oil at room temperature. However, for firing into a gas turbine with contemporary combustion equipment, it is necessary to heat residual oils so as to obtain a viscosity less than approximately 20 centistokes at the injection nozzle in order to obtain proper atmoization. In addition, it is normally necessary to heat the fuel hot enough to obtain a viscosity between 200 and 300 centistokes so that it can be properly pumped and filtered prior to injection into the unit.

It is anticipated that the easiest way to fire solvent refined coal into a gas turbine will be to liquify it and inject it using normal fuel injection techniques. However, in the event that this is too difficult, it should also be possible to pulverize it in the solid form and inject it in this manner.

The high temperature parts of a gas turbine are very sensitive to certain trace metals that can occur in this coal product. Specifically, sodium, potassium, lead and vanadium have been bad actors with distillate and residual oils and will cause very rapid high temperature oxidation and corrosion if not kept to very low levels. Calcium can be a problem because it produces a hard bucket deposit. In a normal fuel oil sodium plus potassium content should be kept below about 1 ppm and vanadium content should be kept below about 2 ppm. This is normally accomplished by removing the sodium and potassium from the fuel by washing and by addition of an inhibitor to counteract the effects of the vanadium since it is not possible to readily remove it. Since there is currently no economic method of removing lead, fuels containing more than a few ppm (which occurs only rarely) are avoided.

The following table gives the characteristics of the solvent refined coal product.

TABLE A-10

INSPECTIONS ON SRC PRODUCT

| Fraction | Solvent Refined Coal | Light Liquids | Wash Liquid |
|---|---|---|---|
| Approximate Boiling Range, ° F | 850+ | IBP-450 | 450–550 |
| Gravity, g/cc | 1.24 | | 1.063 |
| Gravity, ° API | −18.3 | 25.3 | 1.6 |
| Carbon, W% | 88.41 | 84.7 | 81.53 |
| Hydrogen, W% | 5.15 | 10.5 | 8.09 |
| Nitrogen, W% | 1.84 | 0.3 | 0.25 |
| Sulfur, W% | 0.78 | 0.3 | 0.37 |
| Oxygen, W% | 3.72 | | 9.76 |
| Ash, W% | 0.10 | | |
| Melting Point: ° C | 200 | | |
| Paraffins, % | | | |
| Olefins, % | | | |
| Aromatics, % | | | 90 |
| Naphthene, % | | | 3.6 |
| Viscosity, CPS at 100 | | | 1.3 |
| Viscosity, CPS at 200 | | | |
| Percent Hydrocarbons | | 75 | |
| Percent Phenols | | 25 | |
| Composition of Phenols, % | | | |
| Phenol | | 8 | |
| O-Cresol | | 7 | |
| M-Cresol | | 26 | |
| Higher Cresylics | | 59 | |
| Composition of Hydrocarbons, % | | | |
| Specific Gravity, g/cc | | 0.86 | |
| Aromatics | | | |
| Benzene | | 0.4 | |
| Toluene | | 3.6 | |
| Alkyl Benzenes | | 33.0 | |
| Indanes + Naphthalenes | | 16.0 | |
| Olefins | | 0 | |

TABLE A-10-continued

| | INSPECTIONS ON SRC PRODUCT | | |
|---|---|---|---|
| Fraction | Solvent Refined Coal | Light Liquids | Wash Liquid |
| Paraffins | | 15.0 | |
| Naphthenes | | 32.0 | |

DESCRIPTION OF THE PREFERRED EMBODIMENTS

Example 1

LABORATORY DEMONSTRATION OF PROCESS USING EQUAL QUANTITIES OF SOLVENT REFINED COAL AND WATER

Figure 2:
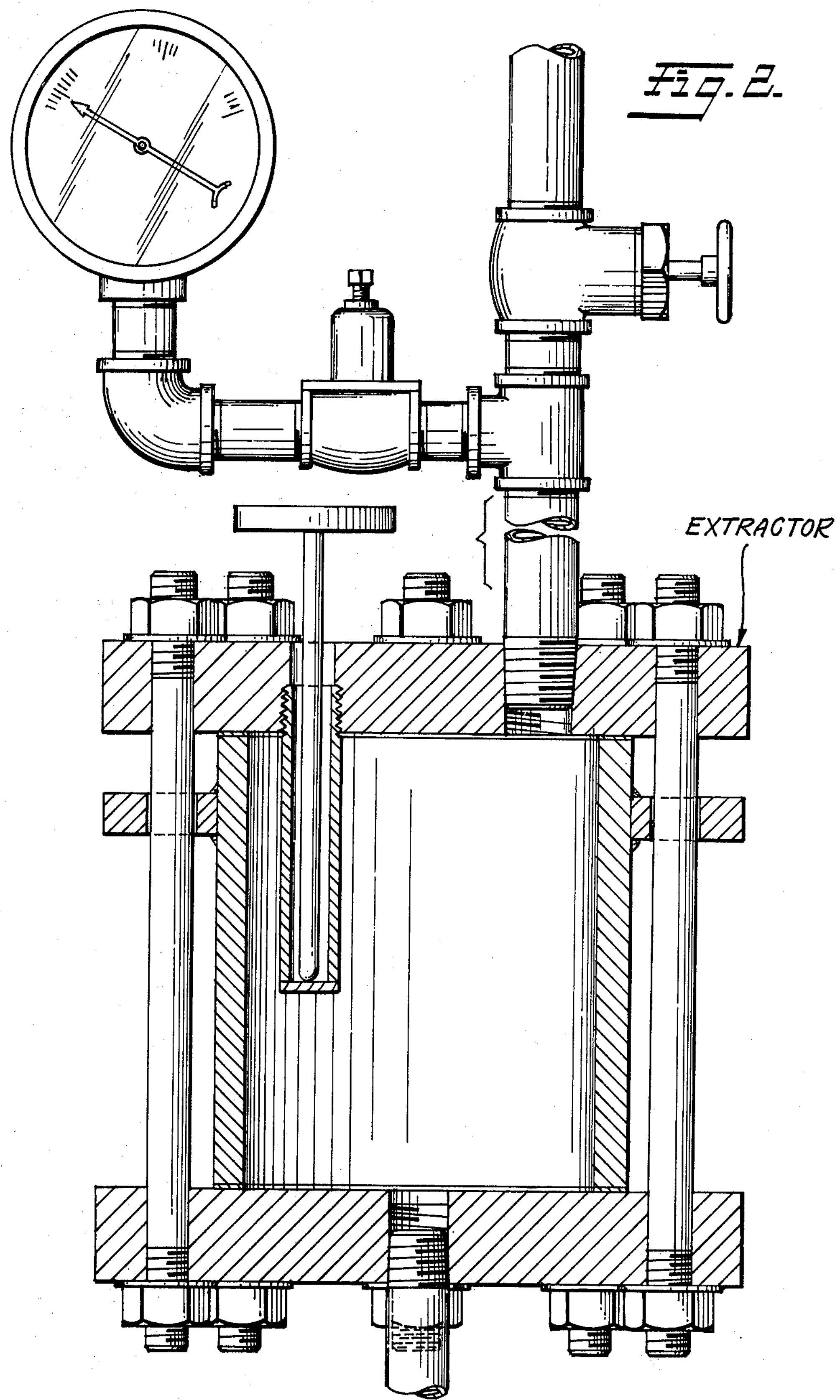
FIG. 2 is a drawing of a test vessel used in development of the process described in the invention.

The solvent refined coal and water was mixed and the mixture heated to a temperature of somewhere around 500° to 550° F. This was carried out in a closed vessel shown in attached FIG. 2 (Drawing No. T-24-1014) so that the pressure at which the mixing and subsequent separation took place was the saturation pressure of a steam and water mixture at the corresponding temperature. These pressures ran in the neighborhood of 600 to 700 psig. At the processing temperature the coal and water were agitated by rolling the vessel gently so as to get thorough (but low shear) contact between the coal and water particles. After this agitation, the mixture was permitted to settle at the high temperature for several hours and then the temperature was permitted to return to atmospheric at which time the vessel was opened. The water was drained off and measurements of the sodium content in both coal and water were made making use of a flame photometer.

Knowing the weight of water and coal initially placed in the vessel, it was possible to compare the total amount of sodium which was found in the wash water after processing with the total amount of sodium in the coal prior to starting the test. The wash water was checked prior to the test and found to have a zero sodium content which was to be expected since it was distilled water. Using the techniques described, we were able to get a good check between the amount of sodium remaining in the coal and the amount found in the wash water. The net result of the test, which was repeated on two separate occasions, was that the sodium content in the coal was reduced to less than 1 ppm, which is acceptable for a direct fired gas turbine fuel.

Example 2

FURTHER TESTS SIMILAR TO EXAMPLE 1 TO DETERMINE THE EFFECT OF TEMPERATURES BETWEEN 400° AND 500° F

Additional demonstration tests were carried out as follows: use was made of the pressure vessel described previously (FIG. 2). Equal quantities of solvent refined coal and water were loaded into the vessel after which it was closed and placed in an oven. Several different demonstrations were run in which the temperature was raised to levels in the range of 400° to 500°. In each case the contents were held at the test temperature for periods ranging from 4 to 6 hours. After being allowed to cool, the vessel was opened and the sodium content of the water and the SRC was measured.

A test at 400° F resulted in a reduction of the sodium level in the SRC to about 8 ppm. A test at 475° F resulted in a sodium content of just slightly less than 1 ppm in the SRC and a test at 500° F resulted in a sodium content in the SRC of 0.7 ppm.

In all of the tests, the amount of water recovered was between 20 and 25% less than the amount that had been added to the vessel. Also, the sodium content measured in the water was somewhat higher than the sodium content measured in the SRC to start with. If we assume that about 15 to 20% of the water was evaporated during the process through leakage, then it appears that there is a good check between the sodium previously in the SRC, and the sodium in the SRC and in the wash water after the processing.

It should be noted that in the particular tests that were run and described above that no significant agitation of the vessel or attempts at mechanical mixing were made after the vessel had been brought up to its peak temperature. It appears that if the SRC is initially in a granular or pulverized form when mixed with water at room temperature, that this is sufficient to provide adequate contact between the water and the sodium and potassium in the coal.

Example 3

EFFECT OF TIME

Periods of 4 to 6 hours were used in the tests described. Prior experience indicates that significantly shorter periods of about 1 hour to ½ hour maybe adequate for this contact process and further tests have also shown that the minimum amount of time required to get adequate sodium or potassium reduction is of the order of ½ hour.

Example 4

PROCESS AND APPARATUS VARIATIONS

Figure 3:
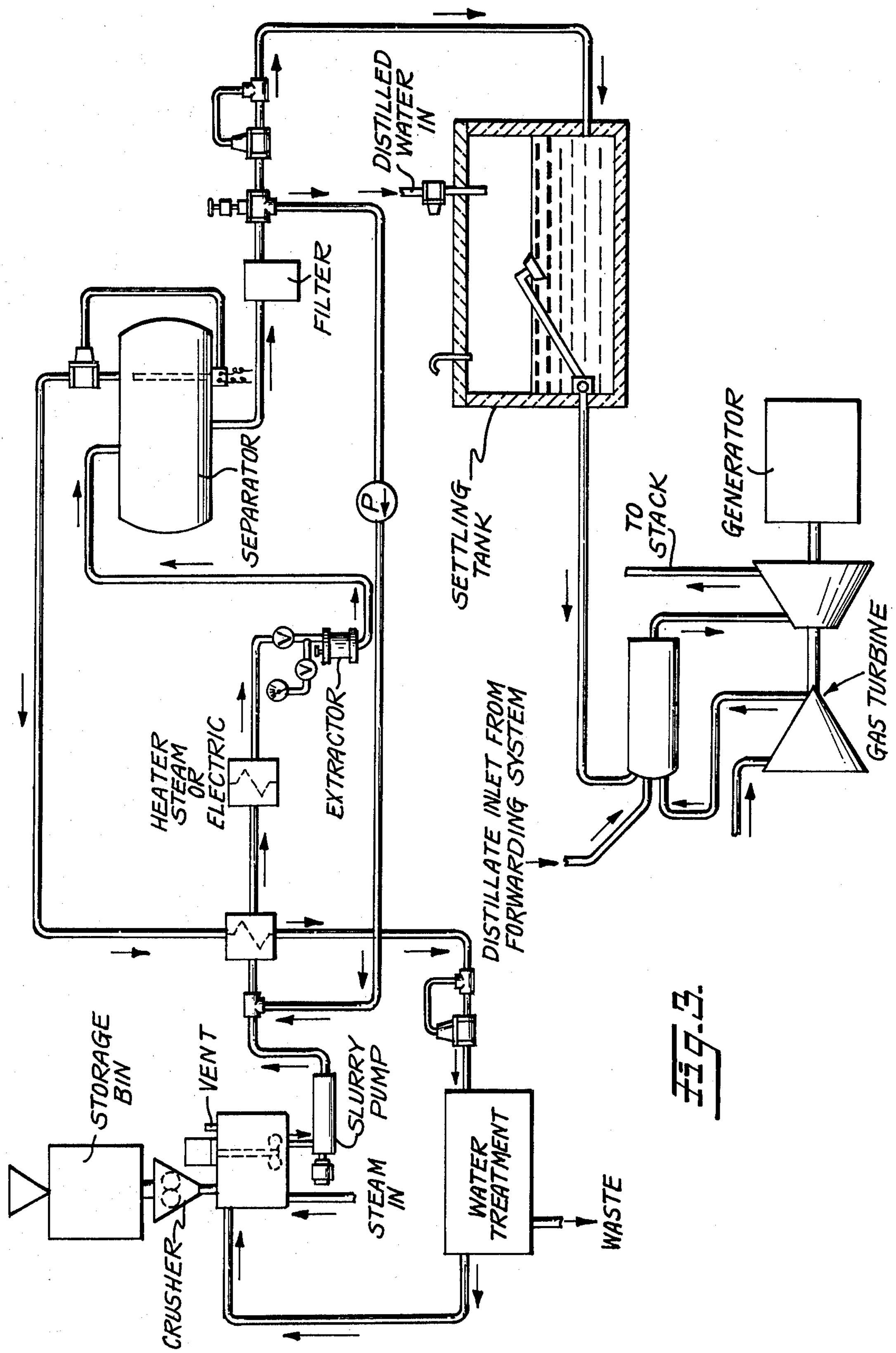
FIG. 3 is a schematic block diagram of a small solvent refined coal cleaning and processing plant to be installed at a gas turbine location.

The implementation of this process in actual practice may take place in two broad phases. Phase 1 involves the utilization of solvent refined coal as currently delivered from processing plants either now in operation or as will be handled from new plants in the planning and construction stages. This solvent refined coal product in the state of the art apparatus is transported to the electric utility or to some other power generation installation and is processed by add-on equipment or is sent through a small but separate processing plant located immediately adjacent to the gas turbine or other power generation equipment. FIG. 3 is a schematic diagram showing how this small separate processing plant is laid out and its operation.

Referring to FIG. 3, there is described briefly the flow process that takes place. Solvent refined coal product is received from the processing plant in a solid form but broken up into chunks similar to very coarse gravel or small stones. This material having a particle size the order of a 32nd of an inch in diameter or smaller; however, is acceptable. After leaving the crusher, the ground solvent refined coal produce is then mixed with water and when convenient, with some amount of direct contact steam in order to raise the temperature close to the boiling point of water at one atmosphere. The purpose of this heating step, preferably with steam, is to remove as much air and particularly oxygen from the mixture as possible prior to proceeding on to heating to higher temperatures.

The quantity of water added at this point is generally about 2 times the quantity of solvent refined coal product although this is determined largely by the amount of water necessary to make a pumpable slurry. It is known that larger quantities of water are required for finer particles. The amount required for the cleaning process is substantially less, however, than that amount required to make a suitable slurry.

The next step is to move through a slurry pump at which point the pressure is raised to the process pressure which may be as high as 1,200 or 1,300 pounds per square inch. Here again, required pressures may be somewhat lower than this but in substantially all cases where existing equipment is used, pressures of this order are desirable. At this point, the mixture is heated partly by extracting some of the energy from the used process water and then partly by the addition of some extra heat whereby the mixture is raised to the process temperature of 500°-550° F.

The mixture then moves into an extractor at which point preferably gentle agitation is provided to get a good contact between the washing water and the solvent refined coal product. As mentioned earlier, this step may not be necessary, although it will be provided in the initial designs. After this step, the mixture moves into a settling tank. The size of this tank is proportioned such that the flow velocity through it is very low and will give an opportunity for the heavier coal product to settle to the bottom with the water rising to the top of the tank.

After leaving the tank, the coal product passes through a final fine filter and (it is our expectation that this final filter will not be required, however, it is provided in the early models) then on into a holding tank from which it will be supplied to the gas turbine as needed. A small amount of distilled water is admitted to this holding tank which will flash to steam and provide a steam blanket so that the material may be held at fluidizing temperatures without degradation of the product.

The wash water leaving the separating tank passes through the recovery heater and then into a water purification system. As mentioned previously, in most installations, it is anticipated that the amount of water required to make a suitable slurry will be something like twice the quantity of the coal product that is being processed. In order to reduce the consumption of water the process, one may make use of either electro-dyalysis, or reverse osmosis, or some other equivalent form of known water treatment whereby most of the water is returned to the process with only a small amount being discharged to waste.

Example 5

PHASE 2 — APPARATUS LOCATED AT A SOLVENT REFINING PLANT

Figure 4:
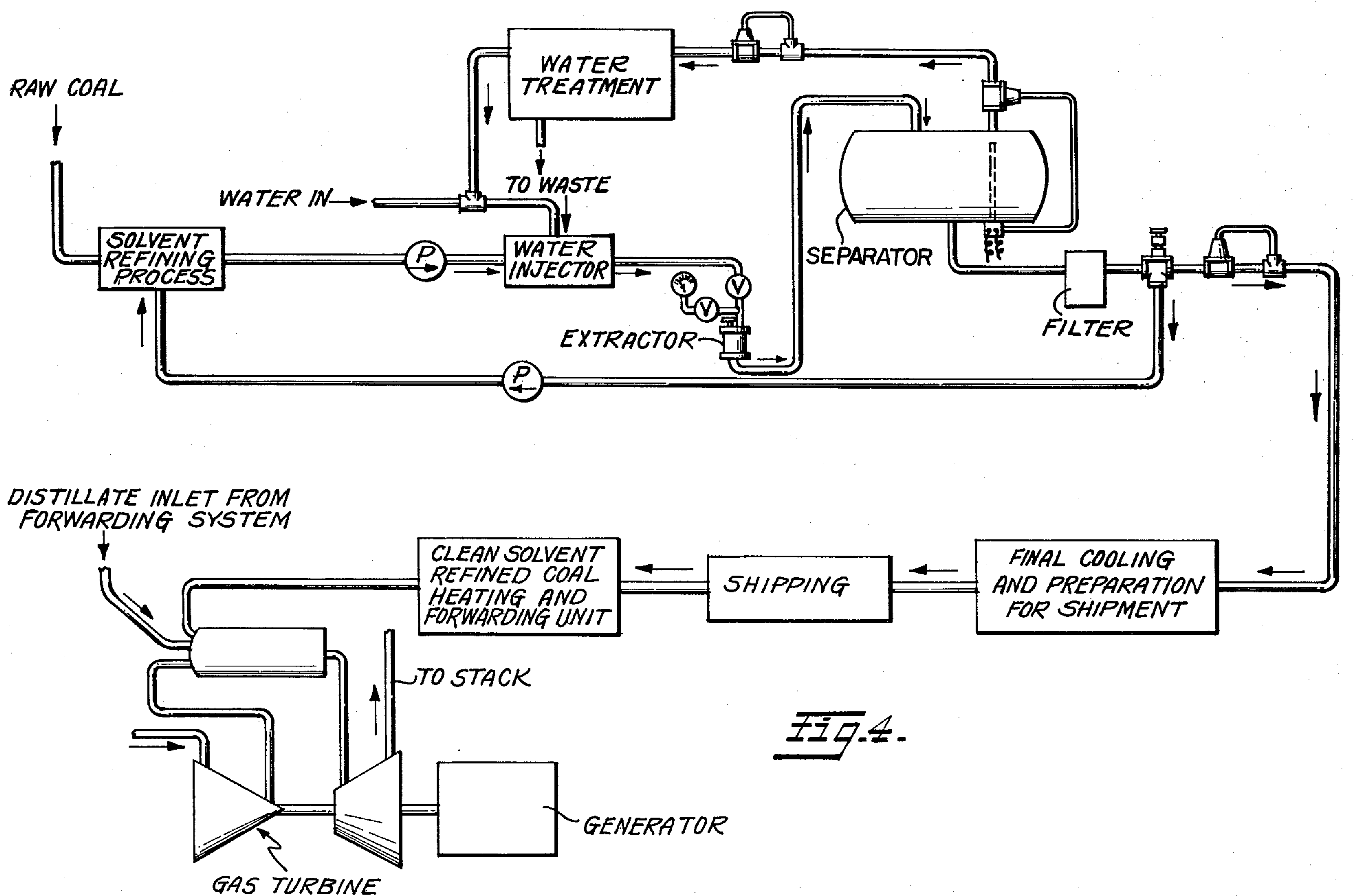
FIG. 4 is a schematic block diagram of a solvent refined coal cleaning and processing system for installation at the coal refinery plant which is a modification of that which is proposed in FIG. 2 and is to be used to supply large quantities of clean fuel for many gas turbines at various locations.

Phase 2 would come at a later date when the utilization of this solvent refined coal product reaches sufficient proportions to justify the addition of processing facilities at the primary solvent refined coal installation. At such time the product having been cleaned up suitably for use in gas turbines prior to being delivered to the power generation plant, it would only be necessary to heat the product at the electric utility installation (under an inert atmosphere) and then forward it to the gas turbine for combustion. FIG. 4 is a schematic diagram of this Phase 2 apparatus showing how the solvent refining coal process would be modified to incorporate the invention according to Phase 2.

After solvent extraction but prior to final cooling and storage of the product, it would again be pumped to a higher pressure (of the order of 1,200 to 1,500 psi) and the temperature raised to the process temperature which may be as high as 550° F. At this point, sufficient water is added (the quantities probably would be significantly smaller than in the processing plant described in FIG. 3 and would be probably something in the order of 10 to 20% of the weight flow of coal product).

After water addition, the product passes into an extractor where sufficient agitation is present to provide the contact between the water and the coal product. After leaving this vessel it passes on to a separating tank in which the water is drawn off the top and the coal product off the bottom. From this point, the wash water is sent directly to waste and the coal product is sent through a recovery heat exchanger and then chilled and sent to storage in the form of coarse granules or whatever storage is typical of the refining plant. Shipment is made at this point to various gas turbine installations.

After receipt of clean solvent refined coal at the gas turbine site it would be fed into a heating tank through a lock hopper arrangement. This would permit keeping an inert atmosphere over the hot solvent refined coal at all times. After heating it would be pumped to the required forwarding pressure and then delivered to the gas turbine.

The above examples show separation of leaching water from the SCR coal, but obviously the cooled water after treatment and slurry may be shipped or pumped under circumstances when it is both feasible and economical, thereby requiring no more than simple separation at the site for use. It may be necessary to add water at the time of separation at the site to compensate for any water that may have evaporated during transit.

What is claimed is:

1. A method of treating solvent refined coal to remove soluble ash and make it suitable for direct firing into a gas turbine comprising:

feeding solvent refined coal and water into a closed pressure-tight vessel to form a pumpable slurry, the amount of water being a minimum of 10% of the weight of coal for proper cleaning and up to about 3 times the weight of coal to provide a pumpable slurry;

heating said slurry in said closed vessel to a temperature of about 500° to 550° F and at corresponding steam-water saturation pressures of from about 675-1035 psig for a period of approximately ½ to 2 hours;

gently agitating while heating to insure low shear liquid-solid contact during said heating; and separating the water from said coal whereby the sodium and potassium salts are reduced to less than 1 part per million.

2. A method for the removal of the last traces of soluble ash and elements from solvent refined coal containing about 0.1-0.2% ash comprising:

feeding solvent refined coal and water into a closed pressure-tight vessel to form a pumpable slurry, the amount of water varying between approximately 10% of the coal to 3 times the coal;

heating the slurry in said closed vessel to a temperature of about 500°-550° F to raise the pressure to 665 to 1035 psig for a period of approximately ½ to 2 hours;

gently agitating the slurry while heating to insure low shear liquid solid contact during said heating; and, separating the water from said coal whereby the total ash content is reduced to approximately 0.05%.

3. A method for processing solvent refined coal to remove sodium and potassium salts and other soluble ash at a power generation site wherein the solvent refined coal is slurried with wash water, deaerated and then processed by heating to a temperature about 500°-550° F in a closed system and at a high enough pressure that air and oxygen are excluded from the process.

4. A method according to claim 3 wherein steps are taken to insure that effective contact is established between the wash water and the solvent refined coal to extract the sodium and potassium salts and other soluble ash into the wash water.

5. A method according to claim 4 wherein the slurry is processed at a pressure of about 675-1035 psig substantially simultaneously with the heating.

6. A method according to claim 5 wherein the wash water subsequently is separated out from the solvent refined coal.

7. A method according to claim 6 wherein the slurry is processed for a period of time of about ½ to 2 hours prior to the wash water being separated.

8. A method according to claim 3 wherein the slurry is processed at a pressure of about 675-1035 psig substantially simultaneously with the heating.

9. A method according to claim 8 wherein the wash water subsequently is separated out from the solvent refined coal.

10. A method according to claim 9 wherein the slurry is processed for a period of time of about ½ to 2 hours prior to the wash water being separated.

* * * * *